Patented May 29, 1945

2,376,891

UNITED STATES PATENT OFFICE 2,376,891

CELLULOSE ESTER MANUFACTURE

Francis P. Alles, Waynesboro, Va., assignor to E. I. du Pont de Nemours & Company, Wilmington, Del., a corporation of Delaware No Drawing. Application July 1, 1942, Serial No. 449,313

2 Claims. (Cl. 8—57)

This invention relates to the manufacture of cellulose organic ester structures having improved dyeing properties. More particularly it relates to the manufacture of wet coagulated cellulose organic ester structures which can be satisfactorily dyed with direct, acid and chrome dyes.

Generally speaking, cellulose organic ester structures have no affinity for direct dyes such as are commonly used for dyeing cotton and regenerated cellulose, nor for acid or chrome dyes such as are commonly used for dyeing silk and wool, unless they are chemically modified by suitable pretreatment. The only exception to this generalization is found in cellulose organic esters in a highly swollen state as may be produced by wet coagulation. Thus, "gel, wet-spun" cellulose acetate yarn, i. e., cellulose acetate yarn which has been made by the wet spinning process and which is still in the freshly coagulated, undried state, accepts direct, acid and chrome dyes. However, structures in the gel state are inherently weak and do not lend themselves conveniently to the usual processing steps which precede dyeing. For this reason it has not been possible heretofore to take advantage of the superior dyeing properties of this material in commercial practice.

An object of this invention, therefore, is to preserve in dry, wet-coagulated cellulose organic ester structures the dyeing properties which characterize such structures in the gel or wet, freshly coagulated state.

Another object is to maintain the characteristic dye affinity of gel, wet-spun cellulose organic ester yarn through the drying step whereby, on rewetting, the yarn may be dyed with acid, direct, and chrome dyes.

A still further object is to treat wet-spun cellulose acetate yarn in the gel state in order to maintain its affinity for acid, direct, and chrome dyes through the drying step.

These and other objects will more clearly appear hereinafter.

These objects are accomplished by my invention which comprises impregnating gel, wet-coagulated structures of cellulose organic ester with a dilute solution or dispersion of a mordant for acid, direct and chrome dyes or precipitating a mordant in situ and thereafter drying the impregnated structures.

"Mordant" as herein used is intended to connote generically all substances having dye accepting properties by virtue of chemical reaction or physical absorption including not only the inorganic or common basic mordants such as the hydroxides or the basic salts of aluminum, chromium and iron but also organic materials such as substances containing trivalent nitrogen as gelatin, casein, glue, glutin, albumin, lanuginic acid, tetraethylene pentamine, glucamine, polyethylene imine, dicyanamide, thiogelatin, polytriglycol adipamide, diacetylated chitin, dimethylaminoethyl methacrylate polymer, the reaction product of triethanolamine and formaldehyde, aminonitrile formaldehyde resins, ethylene imine gelatin reaction product, hexamethylene diamine casein reaction product, and the like, which nitrogen-containing substances are especially useful in accepting and fixing direct, acid and chrome dyes.

Preferably the concentration of the mordant in the impregnating solution or dispersion should be maintained between about 2% and about 5%. However, concentrations as low as 1% and as high as 10% and above may be employed with good result.

To further illustrate my invention, the following specific examples are given. Percentage compositions are by weight unless otherwise indicated.

*Example I*

A solution consisting of 15% cellulose acetate (containing about 54.5% combined acetic acid), 5% water, and 80% acetic acid, was spun into a coagulating bath consisting of 12% acetic acid, 13.5% ammonium acetate, and 74.5% water maintained at a temperature of about 8.5° C. so as to obtain a yarn comprised of 20 denier filaments. The yarn after washing to free it of acetic acid was wet reeled into small skeins. One of these gel skeins was impregnated by immersion in a 3% gelatin solution for one hour after which it was wrung by hand and dried. The dried skein when wet out in water and then immediately dyed with du Pont Pontacyl Carmine 2G (Color Index No. 31) produced a depth of dyeing comparable to that obtained by a similar dyeing of wool, and the light-and wash-fastness of the yarn was excellent.

*Example II*

A skein of gel, wet-spun cellulose acetate yarn produced in accordance with Example I was impregnated by immersion in a 1.75% aqueous solution of tetraethylene pentamine containing sufficient acetic acid to neutralize the solution to about a pH of 7. After drying, the dried yarn was directly immersed in a dye bath of du Pont Pontacyl Blue Black AS (Color Index No. 246) and a depth of dyeing obtained equal to that in a similar dyeing of wool.

Example III

A skein of gel, wet-spun cellulose acetate yarn produced as described in Example I was impregnated by immersion in an aqueous solution containing 2.5% glucamine and sufficient acetic acid to neutralize the solution to a pH of 7, wrung, and dried. The dried skein was immersed in a dye bath of du Pont Pontacyl Violet RL (Color Index No. 53) for one hour, rinsed, and dried. The depth of dyeing was comparable to that obtained by a corresponding dyeing of wool.

Example IV

A skein of gel, wet-spun cellulose acetate yarn produced in accordance with Example I was impregnated by immersion in a 3% solution of polytriglycol adipamide in water. After drying, the dry yarn was directly immersed in a dye bath of du Pont Pontamine Fast Red 8BL (Color Index No. 278). A good fast dyeing was obtained with no noticeable light fading.

Example V

A skein of gel, wet-spun cellulose acetate yarn produced in accordance with Example I was impregnated by immersion in a 20% solution of aluminum chloride and then, while wet, treated with a 14% solution of ammonium hydroxide, washed, and dried. The dry yarn was directly immersed in a dye bath of du Pont Pontamine Fast Red 8BL (Color Index No. 278). The yarn dyed well to a good deep shade.

Although, in the preceding examples, this invention has been described primarily from the standpoint of impregnating gel, wet-spun cellulose organic ester yarn, it is not so limited but comprehends rather the treatment of other structures such as films, sheeting, tubes, bands, and the like. It is also applicable to improving affinity for acid, direct, and chrome dyes of cellulose acetates that are not acetone-soluble, such as cellulose triacetate. The invention is also applicable to other cellulose esters such as cellulose propionate, cellulose butyrate, and mixed esters such as cellulose acetate propionate and cellulose acetate butyrate, and any other cellulose ester which is capabe of being wet-spun.

I claim:

1. The method of preserving the affinity of wet-spun cellulose acetate yarn for direct, acid, and chrome dyes which comprises impregnating said yarn while in the gel stage with a liquid composition containing from about 1% to about 10% by weight of polytriglycol adipamide.

2. A dry cellulose acetate yarn the filaments of which are impregnated with from about 1% to about 10% by weight of polytriglycol adipamide, said yarn having an affinity for direct, acid and chrome dyes.

FRANCIS P. ALLES.